US010399168B2

(12) United States Patent
Lecomte et al.

(10) Patent No.: US 10,399,168 B2
(45) Date of Patent: Sep. 3, 2019

(54) METHOD FOR PRODUCING CAVITIES FOR A TURBOMACHINE DISK

(71) Applicant: SAFRAN AIRCRAFT ENGINES, Paris (FR)

(72) Inventors: Janvier Lecomte, Montgeron (FR); Jean-Michel Buelyha, Vignoles (FR); Juri Kraft, Forbach (FR); Andreas Grützmacher, Forbach (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 443 days.

(21) Appl. No.: 14/898,781

(22) PCT Filed: Jun. 6, 2014

(86) PCT No.: PCT/FR2014/051358
§ 371 (c)(1),
(2) Date: Dec. 16, 2015

(87) PCT Pub. No.: WO2014/202862
PCT Pub. Date: Dec. 24, 2014

(65) Prior Publication Data
US 2016/0368071 A1 Dec. 22, 2016

(30) Foreign Application Priority Data

Jun. 17, 2013 (FR) ...................... 13 55647

(51) Int. Cl.
*B23H 3/04* (2006.01)
*B23H 9/00* (2006.01)
(Continued)

(52) U.S. Cl.
CPC ............ *B23H 9/006* (2013.01); *B23H 3/04* (2013.01); *B23H 9/02* (2013.01); *F01D 5/02* (2013.01);
(Continued)

(58) Field of Classification Search
None
See application file for complete search history.

(56) References Cited

U.S. PATENT DOCUMENTS 3,288,699 A 11/1966 Trager et al.
7,462,273 B2 * 12/2008 Mielke .................... B23H 3/00
204/212

(Continued)

FOREIGN PATENT DOCUMENTS

EP 2 011 597 A2 1/2009
WO WO 2012/028830 A1 3/2012

OTHER PUBLICATIONS

International Search Report as issued in International Patent Application No. PCT/FR2014/051358, dated Jul. 25, 2014.

*Primary Examiner* — Stefanie S Wittenberg
(74) *Attorney, Agent, or Firm* — Pillsbury Winthrop Shaw Pittman LLP

(57) ABSTRACT

A method for producing cavities in a turbomachine disk, the cavities extending between first and second lateral surfaces of the disk, the method including positioning a ring facing the first surface, the ring including an inner periphery including protrusions complementary in shape to the cavities that are to be produced; circulating an electrolyte close to the protrusions on the ring; activating a first translational movement of the ring towards the second surface; activating a rotation of the disk; generating an electric current pulse in the electrolyte when the ring is substantially at the first surface, the pulse resulting in the ionic dissolution of the disk at the protrusions; reducing the speed of rotation to a first reduced speed, when the ring is substantially at the first surface, for a first period of time; and stopping the first translation of the ring when the ring is beyond the second surface.

5 Claims, 4 Drawing Sheets

(51) Int. Cl.
    *B23H 9/02*    (2006.01)
    *F01D 5/02*    (2006.01)
    *B23H 9/10*    (2006.01)
(52) U.S. Cl.
    CPC ............ *B23H 9/10* (2013.01); *B23H 2300/10* (2013.01); *F05D 2230/10* (2013.01)

(56) References Cited

U.S. PATENT DOCUMENTS 8,057,645 B2 * 11/2011 McGee .................... B23H 7/18
                                              204/223
2010/0170806 A1 * 7/2010 Klopf ...................... B23H 3/00
                                              205/686

* cited by examiner

METHOD FOR PRODUCING CAVITIES FOR A TURBOMACHINE DISK

CROSS-REFERENCE TO RELATED APPLICATIONS

This is the U.S. National Stage of PCT/FR2014/051358, filed Jun. 6, 2014, which in turn claims priority to French Patent Application No. 1355647, filed Jun. 17, 2013, the entire contents of all applications are incorporated herein by reference in their entireties.

TECHNICAL FIELD OF THE INVENTION

The invention relates to the general field of aeronautics. It relates to turbomachine turbine disks and more particularly methods for producing cavities for axially retaining blades borne by the disks.

TECHNOLOGICAL BACKGROUND OF THE INVENTION

A turbomachine turbine blade is composed of a disk and moving blades rotationally driven by the disk under the effect of a flow of fluid from upstream to downstream through the turbine. It may be noted that the terms "upstream" and "downstream" are to be considered with respect to a general direction of flow of fluids through the turbomachine, going from upstream to downstream.

For the mounting of blades, the disk comprises on its circumferential surface a plurality of uniformly distributed teeth, protruding radially outwards from the disk and extending between two parallel lateral surfaces of the disk, said surfaces being orthogonal to the axis of rotation of the disk. The teeth are regularly spaced apart from each other over the whole circumference of the disk. The spaces between two adjacent teeth delimit cavities in which are engaged the blades of the wheel by their respective roots, enabling a radial maintaining of the blades by form fitting.

A cavity 10 delimited by two teeth 11 is schematically represented in FIG. 1. The cavity extends between two lateral surfaces 12 of the disk. Several zones of a cavity 10 may be distinguished:
  The opening 13, which is the zone radially open outwards
  The bottom 14, which is the zone opposite to the opening 13, serving as radial support for a blade root
  The two sides 15, which are the two sloping zones on either side of the cavity 10, extending between the bottom 14 and the opening 13, and between the two lateral surfaces 12 of the disk
  The inlet 16 and the outlet 17, which are the open zones at the lateral surfaces 12 of the disk.

The cavities are generally sloping with respect to the axis X of the disk, as is shown in FIG. 2. FIG. 2 shows a plurality of cavities 10 seen from their openings 13. The cavities 10 extend between the two lateral surfaces 12 along a direction sloping according to an angle α with respect to the axis X of the disk. In the example represented, the angle α is equal to fifteen degrees.

At present, given the sloping constraint of the cavities, the cavities are conventionally machined one by one, by a broaching operation. A rectilinear broach of which the section corresponds to the profile of a cavity enables a removal of material so as to form the cavities. It may be noted that the broaching operation may be replaced by a milling operation. The cavities then undergo a filleting operation at the cavity inlet and outlet. Filleting makes it possible to remove the sharp edges at the inlet and the outlet of the cavities, to avoid a concentration of mechanical stresses in these zones. To finish, a machining of the circumferential surface of the disk is carried out. The machining of the circumferential surface of the disk corresponds to the machining of the extremal parts 18 of the teeth 11.

However, the operations of machining the cavities (by broaching or milling), filleting and machining the circumferential surface of the disk require heavy investments (often several million euros) and are costly in consumables.

Furthermore, the production of cavities is long since three successive operations have to be carried out.

Moreover, in the case of two-tier disks, an example of which is illustrated in FIG. 3, it is not possible to carry out broaching or milling operations on the smaller diameter disk. FIG. 3 represents in fact a two-tier disk 30, including a first tier 31 and a second tier 32, the first tier 31 having a smaller diameter than the second tier 32. It will be understood that a broach cannot be used to produce the cavities 33 of the first tier 31 without damaging the second tier 32.

GENERAL DESCRIPTION OF THE INVENTION

The invention offers a solution to the aforementioned problems, by proposing a method for producing sloping cavities of a turbomachine disk, applicable to two-tier disks, and which makes it possible to do away with broaching or milling operations. In a preferred embodiment, the invention further makes it possible to carry out the three operations described previously at one time.

According to a first aspect, the invention thus essentially relates to a method for producing a plurality of cavities in a turbomachine disk, said cavities extending between a first lateral surface and a second lateral surface of a turbomachine disk, said first surface and second surface extending orthogonally to an axis of the disk.

The method comprises the following steps:
  Positioning a ring facing the first surface so as to centre the ring on the axis of the disk, said ring comprising an inner periphery including a plurality of protrusions complementary in shape to the cavities that are to be produced
  Circulating an electrolyte close to the protrusions on the ring
  Activating a first translational movement of the ring along the axis of the disk towards the second surface
  Activating a rotation of the disk about the axis of the disk
  Generating an electric current pulse in the electrolyte when the ring is substantially at the first surface, said pulse resulting in an ionic dissolution of the disk at the protrusions on the ring
  Reducing the speed of rotation to a first reduced speed, when the ring is substantially at the first surface, for a first period of time.
  Stopping the first translation of the ring when the ring has been moved in translation beyond the second surface.

"The shape of object A is complementary to the shape of object B" is taken to mean that, subject to adequate dimensions, object A fits into object B like pieces of a puzzle. The expression "inverted shape" may also be used. It may be noted that the notion of shape is independent of the notion of dimensions. For example, Russian nesting dolls have the same shape, but are of different dimensions.

Reducing the speed of rotation to a first reduced speed, when the ring is substantially at the first surface, makes it possible to avoid a step of machining sharp edges. This makes it possible in fact to generate radiuses of curvature at the inlet of the cavities. The first period of time and the first speed are chosen as a function of the desired filleting.

It may be noted that stopping the first translation of the ring when the ring has been moved in translation beyond the second surface, notably makes it possible, in the case of a two-tier disk, to stop the displacement of the ring before it reaches the tier following that which has just been machined.

Apart from the characteristics that have just been mentioned in the preceding paragraph, the method according to the first aspect of the invention may have one or more additional characteristics among the following, considered individually or according to any technically possible combinations thereof.

According to a non-limiting embodiment, the method comprises the following step:
changing the direction of rotation of the disk and activating a second translational movement of the ring along the axis of the disk, towards the first surface. Thus, the ring may be removed, particularly in the case of a two-tier disk.

According to a non-limiting embodiment, the first reduced speed is zero. This embodiment is simple to implement.

According to a preferred embodiment, the method comprises a following step:
Reducing the speed of rotation to a second reduced speed, when the ring is substantially at the second surface, for a second period of time.

Reducing the speed of rotation to a second reduced speed, when the ring is substantially at the second surface, makes it possible to avoid a step of machining of sharp edges. This makes it possible in fact to generate radiuses of curvature at the outlet of the cavities. The second period of time and the second speed are chosen as a function of the desired filleting.

According to a non-limiting embodiment, the second reduced speed is zero. This embodiment is simple to implement.

According to a second aspect, the invention relates to a ring for producing a plurality of cavities in a turbomachine disk, comprising:
An inner periphery including a plurality of protrusions complementary in shape to the cavities that are to be produced
Means of circulating an electrolyte close to said protrusions.

The means of circulating an electrolyte at the protrusions make it possible to improve the distribution of the electrolyte at the protrusions.

Apart from the characteristics which have just been mentioned in the preceding paragraph, the ring according to the second aspect of the invention may have one or more additional characteristics among the following, considered individually or according to any technically possible combinations thereof.

According to a preferred embodiment, the ring comprises two superimposed layers:
an annular intermediate layer comprising the inner periphery including the plurality of protrusions
an annular lower layer comprising a part of the means of circulating electrolyte:
a plurality of lugs situated at each protrusion, the lugs comprising a plurality of micro-channels
a plurality of transversal channels supplying the micro-channels
a circular channel supplying the transversal channels.

According to a preferred embodiment, the ring comprises an annular upper layer superimposed on the intermediate layer, comprising means of supplying with electrolyte the circular channel.

Advantageously, the ring according to the second aspect of the invention is used during the implementation of the method according to the first aspect of the invention.

According to a third aspect, the invention relates to a device for producing a plurality of cavities in a turbomachine disk, said cavities extending between a first circular lateral surface and a second circular lateral surface of a turbomachine disk, said first surface and second surface extending orthogonally to an axis of the disk, said device comprising:
Means of positioning a ring facing the first surface so as to centre the ring on the axis of the disk,
Means of propagating an electrolyte close to the protrusions on the ring
Means of generating an electric pulse in the electrolyte
Means of moving the ring in translation along the axis of the disk
Means of rotating the disk about the axis of the disk.

Apart from the characteristics which have just been mentioned in the preceding paragraph, the device according to the third aspect of the invention may comprise means of adjusting the speed of rotation of the disk.

Advantageously, the device according to the third aspect of the invention is used to implement the method according to the first aspect of the invention.

BRIEF DESCRIPTION OF THE FIGURES

The figures are only presented for illustrative purposes and in no way limit the invention. The figures show.

DETAILED DESCRIPTION OF AT LEAST ONE EMBODIMENT OF THE INVENTION

Unless stated otherwise, a same element appearing in the different figures has a single reference.

The method uses an electrochemical machining method, known as PECM (Pulsed Electrical Chemical Machining), known to those skilled in the art, the basic principles of which are given hereafter. PECM is a derivative of ECM (Electrical Chemical Machining), which is an electrochemical machining by anodic or oxidation-reduction dissolution of the material of a part. The machined shapes are obtained using a tool reproducing its inverted shape in the part by driving the tool into the part. In other words, the shapes of the tool and the part are complementary.

Figure 4:
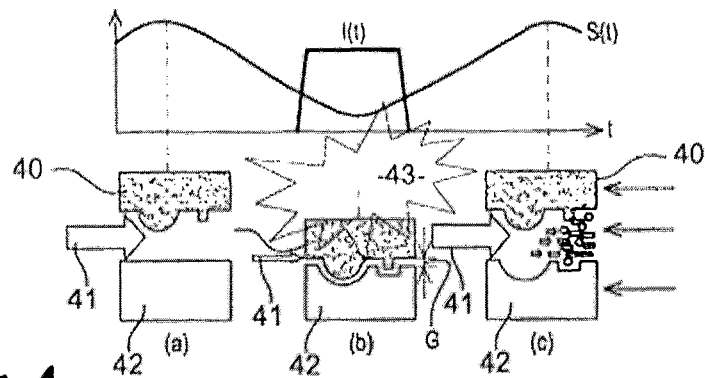

More precisely, with reference to FIG. 4, the PECM uses a pulsed current I(t) combined with an oscillatory movement S(t) of a tool 40. A pressurised electrolyte 41 circulates between the tool 40 and a part 42 to machine (steps (a), (b) and (c)). The shapes of the tool 40 and the part 42 have no relation with the invention, and serve uniquely to illustrate the principle of PECM. Initially, the tool 40 is in an upper position, that is to say above the part 42 (step (a)). The tool 40 is moved in translation towards the part. When the tool 40 is at the part 42, a current pulse I(t) is started in the electrolyte 41 (step (b)). The tool 40 then plays the role of cathode, the part 42 plays the role of anode, and ionic dissolution 43 occurs. Then the dissolved material and calories are evacuated by the electrolyte 41 (step (c)).

It may be noted that the tool 40 and the part 42 are always distant by a minimum range G called "working range". The advantage of PECM compared to ECM is of reducing this working range and thus increasing the precision of the machining.

Figure 5:
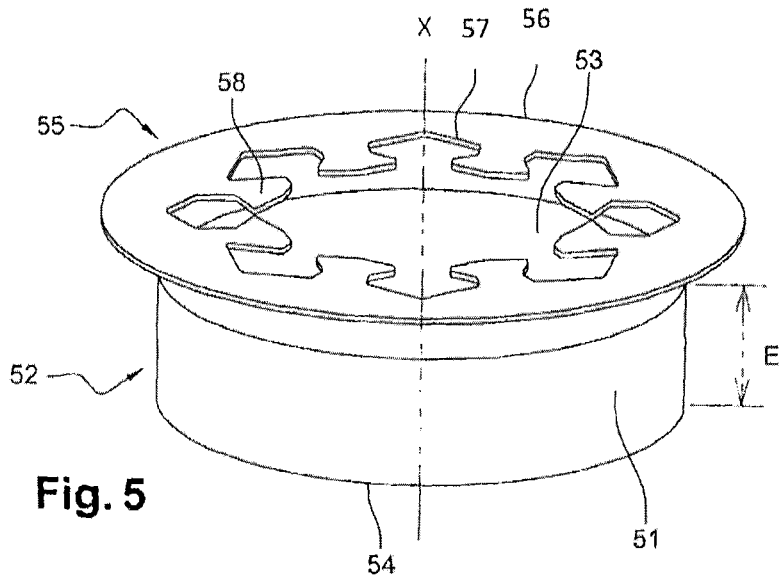
Figure 6:
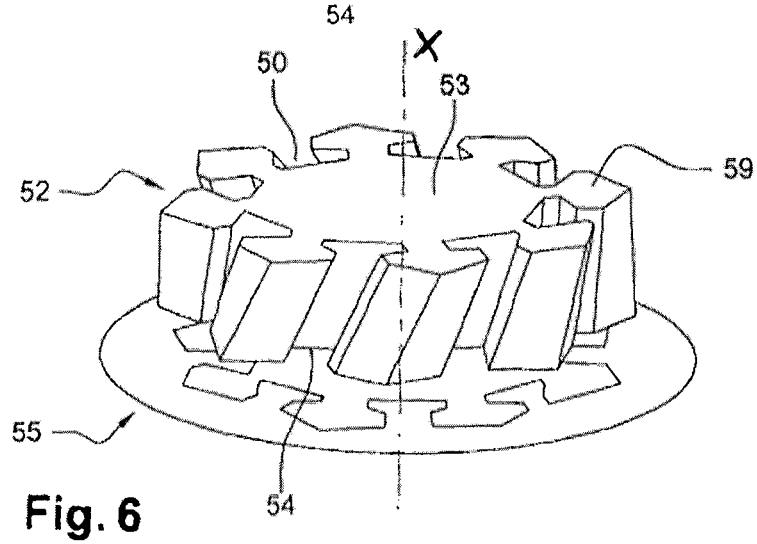

With reference to FIGS. 5 and 6, the invention proposes a method and a device for producing a plurality of cavities 50 at a circumferential surface 51 of a turbomachine disk 52. As explained previously, the space between two cavities 50 is called a tooth 59. In other words, the circumferential surface 51 of the turbomachine disk 52 comprises an alternation of juxtaposed teeth 59 and cavities 50.

Figure 1:
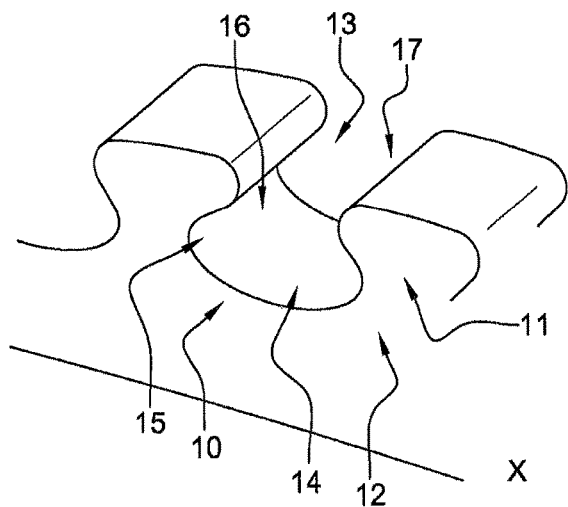
FIG. 1, already described, a schematic representation of a cavity of a turbomachine disk
FIG. 2, already described, a schematic representation a plurality of sloping cavities of a turbomachine disk
FIG. 3, already described, a schematic representation of a turbomachine two-tier disk
FIG. 4, an illustrative diagram of a method of electrochemical machining
FIG. 5, a schematic representation of a ring and a disk before the implementation of a method according to the invention
FIG. 6, a schematic representation of the ring and the disk of FIG. 4, during a step of the method
FIG. 7, a schematic representation of a helical trajectory
FIG. 8, a schematic representation of a device according to a non-limiting embodiment of the invention
FIG. 9, a schematic representation of a ring according to a non-limiting embodiment of the invention, said ring comprising three layers
FIG. 10, a schematic representation of two layers of the ring of FIG. 9.
Figure 2:
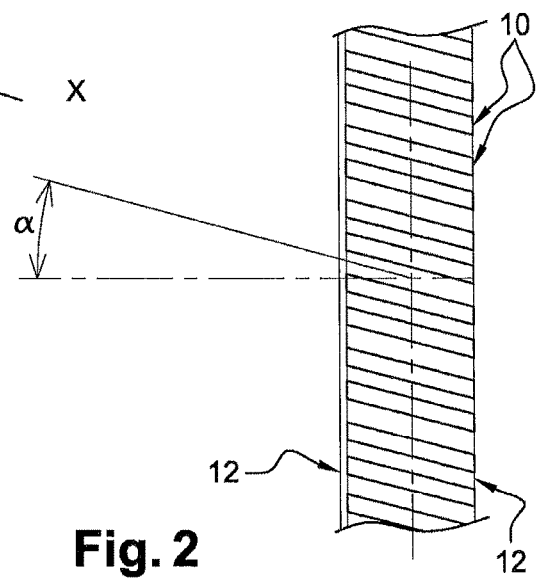
Figure 3:
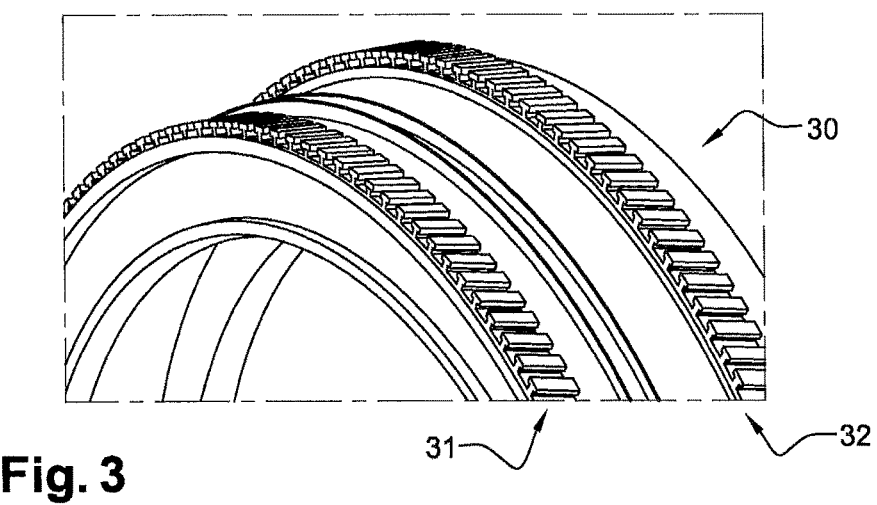

It may be noted that FIGS. 1 and 2 represent an extremely simplified disk 52 in order to facilitate understanding of the invention. The cavities 50 extend between a first lateral surface 53 and a second lateral surface 54 of the disk 52, according to an angle α with respect to the axis X of the disk 52. The first surface 53 and second surface 54 are substantially parallel to each other and orthogonal to the axis X of the disk 52.

The device and the method implement a ring 55 which will be described in detail hereafter. The ring 55 plays the role of cathode and the disk 52 plays the role of anode to carry out an electrochemical machining of the cavities 50 by PECM. The ring 55 has a low thickness compared to the space E between the first surface 53 and the second surface 54, and comprises an outer periphery 56 and an inner periphery 57.

The inner periphery 57 of the ring 55 comprises a plurality of protrusions 58 complementary in shape to the cavities 50 that are to be produced, and of slightly smaller dimensions due to the working range G. Furthermore, between the protrusions 58, the inner periphery 57 has an inverted shape of the teeth 59 that are to be produced. In fact, the diameter of the outer periphery 56 is greater than the diameter of the disk 52. Thus, the patterns machined in the disk 52 are the patterns of the inner periphery 57 of the ring 55. The machining of the cavities 50 and the machining of the outer circumference of the disk 52 are thus carried out at one time.

Figure 7:
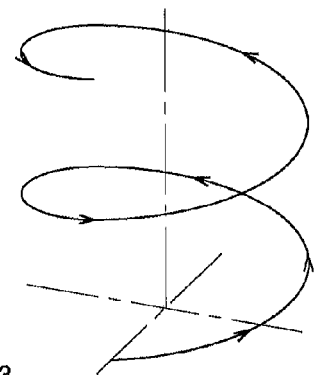

To produce sloping cavities 50, the ring 55 is driven into the disk 52 according to a movement in translation while the disk 52 undergoes a rotation about its axis X. Thus, the relative movement of the ring 55 with respect to the disk 52 is a helical movement, as illustrated in FIG. 7.

More precisely, the method according to a non-limiting embodiment of the invention comprises the following steps:
Positioning the ring 55 facing the first surface 53 so as to centre the ring 55 on the axis X of the disk 52. This positioning corresponds to that illustrated in FIG. 5. In this embodiment, the disk 52 is laid out horizontally on a plate.
Circulating an electrolyte close to the protrusions 58 on the ring 55. The means of circulating the electrolyte are detailed hereafter. The electrolyte circulates in closed loop throughout the whole method. The electrolyte has several roles: transporting the current, expelling dissolved material, and cooling the ring 55 and the disk 52. It may be noted that the temperature of the electrolyte must be maintained between 20 and 30 degrees Celsius.
Activating a first translational movement of the ring 55 along the axis X of the disk 52 towards the second surface.
Activating a rotation of the disk 52 about the axis X of the disk 52, for example by rotating the plate on which the ring 55 is positioned. The speed of rotation of the disk 52 is adjustable. It may be noted that the activation of the first translational movement may be carried out after the activation of the rotation of the disk 52, or at the same time. In the embodiment described, the first translational movement takes place at constant speed, and only the speed of rotation of the disk 52 is modifiable. This combination is the simplest to implement. In other embodiments, the disk 52 is in rotation at constant speed and the speed of the first translational movement is modifiable. In another embodiment, the speed of the first translational movement and the speed of rotation are both modifiable. In fact, the combination of the speed of rotation and the speed of the first translational movement determines the angle α of the cavities 50.
Reducing the speed of rotation to a first reduced speed, or even stopping the rotation of the disk 52, when the ring 55 is substantially at the first surface 53, for a first period of time. This makes it possible to generate radiuses of curvature at the cavity inlet 50. The first period of time and the first speed are chosen as a function of the desired filleting. The first reduced speed is for example zero: thus, the radius of curvature only depends on the first period of time, and the implementation is simplified.
Generating an electric current pulse in the electrolyte when the ring 55 is substantially at the first surface 53, said pulse resulting in the ionic dissolution of the disk 52 at the protrusions 58 on the ring 55. The current density is determined so as to dissolve correctly the material of the disk 52. In fact, depending on the compounds, the dissolution is more or less rapid. It may be noted that turbomachine disks are generally made of nickel based alloy; in this case, a current density between 25 and 100 Amperes per square centimeter is appropriate. Furthermore, several parameters have an influence on the number and the depth of the pits and the length of the inter-granular attacks, particularly the nature of the electrolyte, the flow rate of electrolyte, the current density, and the current generator used.
Reducing the speed of rotation to a second reduced speed, or even stopping the rotation of the disk 52, when the ring 55 is substantially at the second surface 54, for a second period of time. This makes it possible to generate radiuses of curvature at the cavity outlet 50. The second period of time and the second speed are chosen as a function of the desired filleting. The second reduced speed is for example zero: thus, the radius of curvature only depends on the second period of time, and the implementation is simplified.

Stopping the first translation of the ring 55 when the ring 55 has been moved in translation beyond the second surface 54. This positioning corresponds to that illustrated in FIG. 6. It may be noted that in the case of two-tier disks 52, the first translational movement must be stopped before the ring 55 reaches the following tier, so as not to damage it.

Activating a second translational movement of the ring 55 along the axis X of the disk 52 towards the first surface 53, to remove the ring 55 and evacuate the dissolved material and calories. The rotation of the disk 52 has to be reversed for this, so that the ring 55 does not damage the disk 52 and the cavities 50 during its removal.

Figure 8:
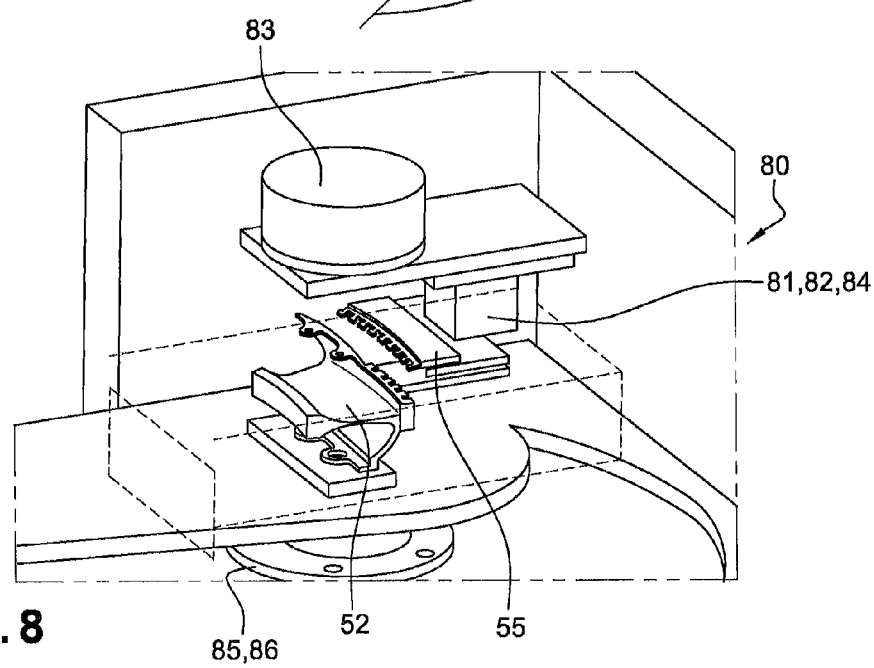

FIG. 8 illustrates a device 80 making it possible to implement the method described previously, according to an embodiment of the invention. The disk and the ring 55 are represented truncated. The device 80 comprises:

- means of positioning 81 the ring 55 facing the first surface 53 so as to centre the ring 55 on the axis X of the disk 52,
- means of propagating 82 the electrolyte close to the protrusions 58 on the ring 55
- means of generating 83 an electric pulse in the electrolyte
- means of moving 84 the ring 55 in translation along the axis X of the disk 52
- means of rotating 85 the disk 52 about the axis X of the disk 52
- means of regulating 86 the speed of rotation of the disk 52.

It may be noted that insulating and leak tight masks may be used to protect from projections of electrolyte and leakage currents all the surfaces of the disk 52 other than those concerned by the method.

Figure 9:
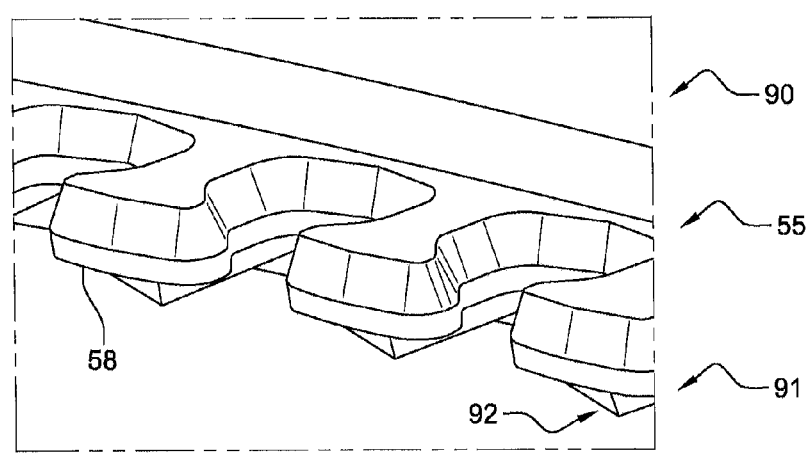

FIG. 9 represents a ring 55 used during the method and used by the device, according to a non-limiting embodiment of the invention. The ring 55 comprises three superimposed layers:

- an upper insulating layer 90
- an intermediate layer 91 bearing protrusions 58
- a lower conducting layer 92 comprising means of circulating electrolyte.

Figure 10:
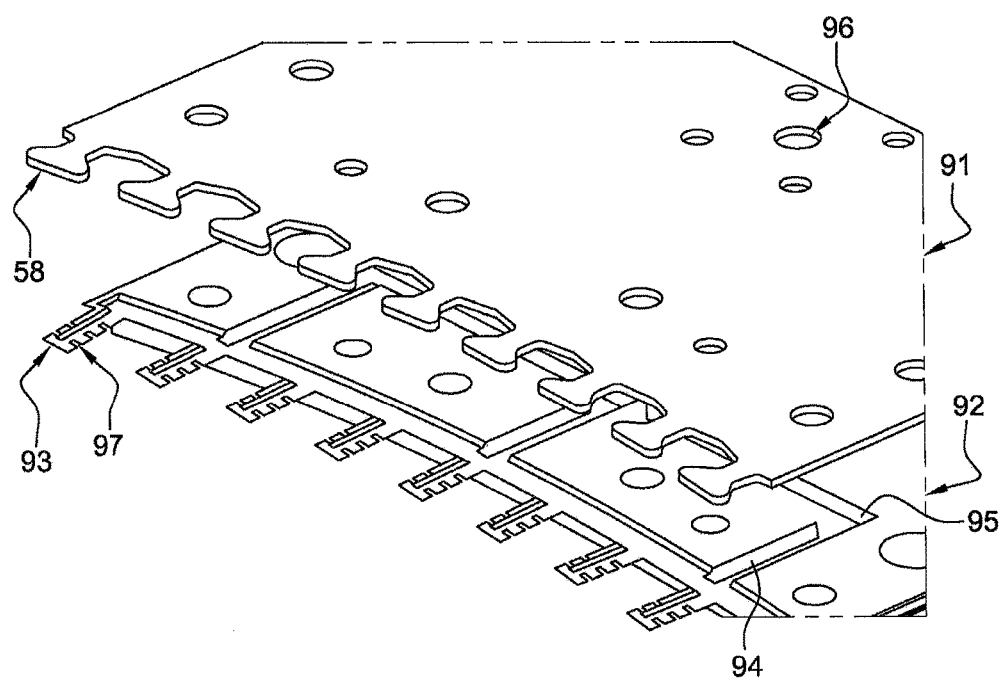

With reference to FIG. 10, which shows the intermediate layer 91 and the lower layer 92 in exploded view, said means of circulation comprise:

- a plurality of lugs 93 situated at each protrusion 58, the lugs comprising a plurality of micro-channels 97
- a plurality of transversal channels 94 supplying the micro-channels 97
- a circular channel 95 supplying the transversal channels 94.

The electrolyte is brought in via the circular channel 95, which supplies the transversal channels 94, which themselves supply the micro-channels 94. This makes it possible to assure a uniform distribution and in sufficient quantity of the electrolyte at the protrusions 58.

The circular channel 95 is itself supplied via openings 96 cut out at several spots of the intermediate layer 91 and the upper layer 90.

The invention claimed is:

1. A method for producing a plurality of cavities in a turbomachine disk, said cavities extending between a first lateral surface and a second lateral surface of the turbomachine disk, said first lateral surface and second lateral surface extending orthogonally to an axis of the disk, the method comprising:

positioning a ring facing the first lateral surface so as to centre the ring on the axis of the disk, said ring comprising an inner periphery including a plurality of protrusions complementary in shape to the cavities that are to be produced;

circulating an electrolyte close to the protrusions on the ring;

activating a first translational movement of the ring along the axis of the disk towards the second lateral surface;

activating a rotation of the disk about the axis of the disk;

generating an electric current pulse in the electrolyte when the ring is substantially at the first lateral surface, said pulse resulting in the ionic dissolution of the disk at the protrusions on the ring;

reducing the speed of rotation to a first reduced speed, when the ring is at the first lateral surface, for a first period of time, the first period of time and the first reduced speed being chosen as a function of a desired filleting, and stopping the first translation of the ring when the ring has been moved in translation beyond the second lateral surface.

2. The method according to claim 1, further comprising:
    activating a second translational movement of the ring along the axis of the disk towards the first lateral surface.

3. The method according to claim 2, wherein the first reduced speed is zero.

4. The method according to claim 1, further comprising:
    reducing the speed of rotation to a second reduced speed, when the ring is substantially at the second lateral surface, for a second period of time.

5. The method according to claim 4, wherein the second reduced speed is zero.

* * * * *